United States Patent
Rogers et al.

(10) Patent No.: US 11,803,536 B2
(45) Date of Patent: Oct. 31, 2023

(54) REAL TIME SYSTEM FOR INGESTION, AGGREGATION, AND IDENTITY ASSOCIATION OF DATA FROM USER ACTIONS PERFORMED ON WEBSITES OR APPLICATIONS

(71) Applicant: Amplitude, Inc., San Francisco, CA (US)

(72) Inventors: Cynthia Rogers, Palo Alto, CA (US); William Pentney, San Francisco, CA (US); Eric Pollmann, Los Altos, CA (US); Muhammad Bilal Mahmood, San Francisco, CA (US)

(73) Assignee: AMPLITUDE, INC., San Francisco, CA (US)

( * ) Notice: Subject to any disclaimer, the term of this patent is extended or adjusted under 35 U.S.C. 154(b) by 811 days.

(21) Appl. No.: 16/740,302

(22) Filed: Jan. 10, 2020

(65) Prior Publication Data
US 2021/0216536 A1  Jul. 15, 2021

(51) Int. Cl.
*G06F 16/30* (2019.01)
*G06F 16/23* (2019.01)

(52) U.S. Cl.
CPC ............... *G06F 16/2379* (2019.01)

(58) Field of Classification Search
CPC .............. G06F 16/2379; G06F 16/958; G06Q 30/0201; G06Q 30/0282
See application file for complete search history.

(56) References Cited

U.S. PATENT DOCUMENTS

| | | | |
|---|---|---|---|
| 8,782,162 B1* | 7/2014 | Deshpande | G06F 16/95 709/224 |
| 8,812,960 B1* | 8/2014 | Sun | G06F 16/2465 715/757 |
| 2007/0156809 A1 | 7/2007 | Dickinson et al. | |
| 2011/0137950 A1 | 6/2011 | Deng et al. | |
| 2011/0179020 A1 | 7/2011 | Ozzie et al. | |
| 2014/0337474 A1 | 11/2014 | Khuti et al. | |
| 2016/0321308 A1 | 11/2016 | Brinnand | |
| 2017/0206552 A1* | 7/2017 | Rajkumar | G06Q 20/383 |

OTHER PUBLICATIONS

Article entitled "How to Track Unique Users with Behavioural Analytics Tools", by Aerendir, dated Nov. 17, 2018 (Year: 2018).*
Article entitled "Scaling Analytics at Amplitude", by Wong, dated Aug. 25, 2015 (Year: 2015).*

(Continued)

*Primary Examiner* — Mahesh H Dwivedi
(74) *Attorney, Agent, or Firm* — Goodwin Procter LLP (57) ABSTRACT

Systems and methods for data ingestion in real time are described herein. In an embodiment, a server computer receives a message comprising one or more client events from a storage device which publishes the message in response to storing the one or more client events. The server computer stores the one or more client events as raw event strings which are then parsed into parsed event strings. Identity resolution methods are performed on the parsed event strings. Feature groups are then identified in the parsed event strings and used to generate aggregation keys which are used to aggregate the feature groups prior to storing aggregated data in one or more aggregation tables.

34 Claims, 4 Drawing Sheets

(56) References Cited

OTHER PUBLICATIONS

Article entitled "Nova: The Architecture for Understanding User Behavior", by Wong, dated May 25, 2016 (Year: 2016).*
Article entitled "Mixpanel System Architecture", by Jayaram et al., dated Jun. 2018 (Year: 2018).*
International Search Report and Written Opinion for International Patent Application No. PCT/US2020/066456, dated Mar. 18, 2021 (16 pages).

* cited by examiner

REAL TIME SYSTEM FOR INGESTION, AGGREGATION, AND IDENTITY ASSOCIATION OF DATA FROM USER ACTIONS PERFORMED ON WEBSITES OR APPLICATIONS

FIELD OF THE DISCLOSURE

One technical field of the present disclosure is data pipelines for parsing and aggregating data records. Another technical field is resolving anonymous data relating to computer use or activity in relation to known identifiers of computers, accounts or users.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

In the design of websites and client-server applications, the marketers and developers of the websites or applications often have a vision of an optimal usage of the websites or applications. The optimal level of usage often centers around performance of a particular action on the website or application. These actions can include completing a registration or other transaction, performing a purchase, upgrading an account, logging in a certain number of times during a week, contributing content at a specified level, or using other features of the website or application.

However, designing a website or application, or related marketing activities, in a manner that increases the likelihood of users performing specific tasks, is often difficult. Ideally, a website or application developer would be able to find the actions on a website or application that increase the likelihood of performance of a target action. The website or application developer can then rearrange the website or application to prominently feature the actions which cause the highest conversion rate, that is, those that most greatly increase the likelihood of performance of the target action. Or, programmed algorithms can be tuned to cause delivering specified pages to particular users in a particular order or with a particular emphasis. A marketer can engage customers through complementary email and ad networks to drive increased utilization of those same causal actions that maximize likelihood of a subsequent target action.

As companies become more sophisticated with website and application design, the number of actions a person can perform on a website or application greatly increases. With thousands of actions that can be performed, isolating the actions that increase the likelihood of performance of a target action can be increasingly difficult. Analyzing historical data by observing which actions occur prior to the target action is insufficient, as those actions may simply be correlated and not causal to the target action. To address this problem of correlated analysis, one can use machine learning based analysis and causal inference based analysis, but such solutions are only possible as long as a website has access to all of the relevant data.

To implement solutions associated with machine learning or causal inference, an enterprise first needs to be able to access accurate data which links together all actions performed by a user. This can be difficult when some actions are performed prior to a user logging into an account and/or when a user accesses a website on multiple devices. Unlogged data or data that is not recognized as belonging to a specific user can negatively affect causal inference solutions by removing data which could be relevant to performance of specific actions. For instance, if one action is generally performed prior to users logging in, it would be difficult for a system to determine whether that action, alone or in combination with other actions, are correlated to performance of a target action.

Even when actions can be properly linked to users, the amount of data received by a system that tracks interactions can be too large to be feasible to use. For instance, searching through many terabytes of data to identify each user that performed a specific action on the website can be computationally prohibitive. Or, the required level of storage may be impractical. And lastly as data is received, often in an unstructured streaming fashion, the data is often not consumable by machine learning systems that expect data to be aggregated, cleaned, and structured.

SUMMARY OF THE DISCLOSURE

The appended claims may serve as a summary of the disclosure.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. SYSTEM OVERVIEW
3. EVENT AGGREGATION PIPELINE
3.1 RECEIPT OF EVENT DATA
3.2 DATA INGEST
3.3 IDENTIFIER RESOLUTION
3.4 DATA AGGREGATION
3.5 AGGREGATED DATA STORAGE
4. BENEFITS OF CERTAIN EMBODIMENTS
5. HARDWARE OVERVIEW

1. GENERAL OVERVIEW

Systems and methods for performing data aggregation through an improved pipeline are described herein. In an embodiment, a data aggregation pipeline comprises receiving raw event strings, parsing the raw event strings to generate parsed event strings, performing identity resolution on the parsed event strings, breaking feature groups from the parsed event strings, aggregating feature group data, and storing the aggregated data in a database table.

In an embodiment, a method for identity resolution comprises receiving event data including anonymous identifiers and known identifiers, batching key-value pairs of anonymous and known identifiers, performing a batch update of an identifier resolution database using the batched key-value pairs, receiving event data including an anonymous identifier but no known identifier, batching the anonymous identifiers, performing a batch lookup for the anonymous identifiers in the identifier resolution database, performing identifier resolution for the anonymous identifiers that are found in the identifier resolution database and storing the event data in a data repository for later batching for anonymous identifiers that are not found in the identifier resolution database.

2. SYSTEM OVERVIEW

Figure 1:
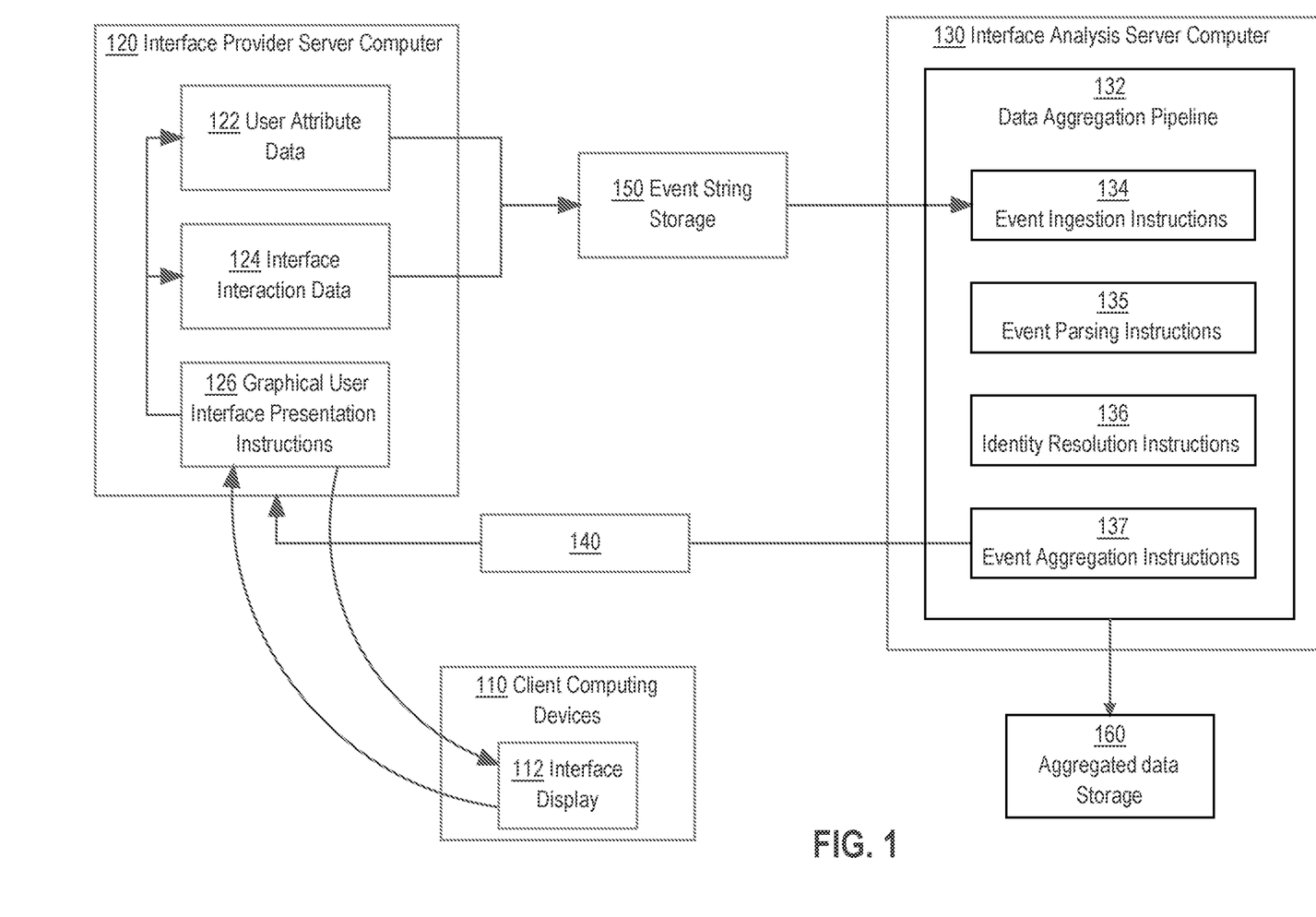
FIG. 1 is a block diagram of a system on which embodiments may be performed.

FIG. 1 is a block diagram of a system on which embodiments may be performed. In FIG. 1, client computing devices 110, interface provider server computer 120, and interface analysis server computer 130 are communicatively couple over one or more networks. The one or more networks may be implemented by any medium or mechanism that provides for the exchange of data between the various elements of FIG. 1. Examples of the network include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. The various elements of FIG. 1 may also have direct (wired or wireless) communications links, depending upon a particular implementation.

Interface provider server computer and interface analysis server computer may be implemented using server-class computers or other computers having one or more processor cores, co-processors, or other computers. The server computers may be physical server computers and/or a virtual server instances stored in a data center, such as through cloud computing. While a single server computer is shown for each of interface provider server computer 120 and interface analysis server computer 130, embodiments may comprise any number of computing devices. For example, interface provider analysis server 130 may be configured to communicate with a plurality of different interface analysis server computers, each of which are monitoring a different graphical user interface. As another example, interface analysis server computer 130 may comprise a plurality of server computers performing computations in parallel, such as a first server computer for receiving and storing event records and a second server computer for performing data ingest of the event records.

Interface provider server computer 120 provides a graphical user interface to client computing devices 110 through graphical user interface presentation instructions 126. The graphical user interface may comprise one or more web pages, one or more applications, and/or any interface which can be displayed on a client computing device and with which the client computing devices 110 can interface. The graphical user interface presentation instructions 126 comprise a set of instructions which, when executed, causes display of the graphical user interface on the client computing devices 110.

The graphical user interface presentation instructions 126, when executed, may further cause interface provider server computer 120 to respond to one or more actions performed by the client computing devices 110 through the graphical user interface. The response may include navigating to a different page of the graphical user interface, altering display of the current page of the graphical user interface, and/or storing data identifying the performed actions.

The client computing devices 110 may comprise computers that include hardware capable of communicatively coupling the computers to one or more server computers, such as interface provider server computer 120 over one or more service providers. For example, client computing device 110 may include a network card that communicates with interface provider server computer 120 through home or office wireless routers (not illustrated in FIG. 1) coupled to an internet service provider. Client computing devices 110 may be any of smart phones, personal computers, tablet computing devices, PDAs, laptops, or any other computing devices capable of transmitting and receiving information and performing the functions described herein. The client computing devices 110 may additionally comprise an interface display 112 comprising software configured to display the graphical user interface received from interface provider server computer 120. For example, the client computing devices 110 may store browser software and/or downloaded applications used to display the graphical user interface.

Interface provider server computer 120 stores interface interaction data 124 and user attribute data 122. User attribute data 122, as used herein comprises attributes that correspond to client computing devices 110 as identified by interface provider server computer 120. Examples of user attribute data 122 include name, gender, personal preferences, postal code, or any other attributes given by a client computing device and/or tracked by interface provider server computer 120. Interface interaction data 124, as used herein, refers to actions performed through the graphical user interface, such as scrolling, selecting, typing, viewing, or other actions that can be tracked by interface provider server computer 120.

Interface provider server computer 120 may provide user attribute data 122 and interface interaction data 124 as event strings to event string storage 150 or interface analysis server computer 130. Event string storage 150 may be a separate storage device, such as cloud storage provided by a third-party provider or a storage device of interface analysis server computer 130. For example, interface provider server computer 120 may combine user attribute data 122 and recent interface interaction data 124 into event strings which interface provider server computer 120 sends to interface analysis server computer 130 through one or more application programming interfaces (APIs) provided by interface analysis server computer 130.

While FIG. 1 depicts the same device storing the interaction data and the graphical user interface presentation instructions 126, in an embodiment the tracking and storage of interaction data is performed by a separate device and/or entity than the providing of the graphical user interface. For example, a third-party customer data platform may track user actions through the graphical user interface and send the tracking data to interface analysis server computer 130.

Interface analysis server computer accesses raw event strings from event string storage 150 and ingests the raw event strings into data aggregation pipeline 132. Data aggregation pipeline 132 comprises instructions for performing a series of data transformations in order to generate aggregated event data. Data generated from data aggregation pipeline 132 may be written out to a database table in aggregated data storage 160 or sent through a front-end process to interface provider server computer 120 in response to a query as aggregated feature information 140. Aggregated data storage 160 may be a separate storage device, such as a database server provided by a third-party provider, or a storage device of interface analysis server computer 130.

Data aggregation pipeline 132 comprises event ingestion instructions 134, event parsing instructions 135, identity resolution instructions 136, and event aggregation instructions 137. Event ingestion instructions 134 comprise computer readable instructions which, when executed by one or more processors, cause interface analysis server computer 130 to identify and retrieve event strings in event string storage 150. Event parsing instructions 135 comprise computer readable instructions which, when executed by one or more processors, cause interface analysis server computer 130 to parse raw event strings into feature groups.

Identity resolution instructions 136 comprise computer readable instructions which, when executed by one or more processors, cause interface analysis server computer 130 to update an identity resolution database with mappings of known identifiers to anonymous identifiers and to update event records that initially did not contain known identifiers by supplying known identifiers from the identity resolution database. Event aggregation instructions 137 comprise computer readable instructions which, when executed by one or more processors, cause interface analysis server computer 130 to aggregate feature groups from event records.

Computer executable instructions described herein may be in machine executable code in the instruction set of a CPU and may have been compiled based upon source code written in JAVA, C, C++, OBJECTIVE-C, Python, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by interface analysis server computer 130 and/or interface provider server computer 120.

3. EVENT AGGREGATION PIPELINE

Systems and methods described herein provide an event aggregation pipeline for generating aggregated data from event records. Interface provider server computer 120 generates event records based on user interactions with a graphical user interface provided by interface provider server computer 120. The graphical user interface may comprise a website or application presented to the client computing device. As the client computing device interacts with the graphical user interface, interface provider server computer 120 generates event records. The generated event records may comprise known attribute data for a specific user and one or more actions performed by the user through the graphical user interface. For example, an event record may identify a user with a login or anonymous identifier, may include stored data regarding the user, and may include the actions of selecting a first page on an interface, performing a search, selecting an item on the interface, and watching a video.

3.1. Receipt of Event Data

In an embodiment, interface provider server computer 120 or a third-party customer data platform sends event records comprising tracked actions to interface analysis server computer 130. For example, interface provider server computer may send JavaScript Objection Notation (JSON) blob to an application programming interface (API) of interface analysis server computer 130. The JSON blob may include an identifier of a user, such as an anonymous identifier generated by interface provider server computer 120 or other source, and one or more feature groups. Feature groups, as used herein, may refer to actions taken by the user through the graphical user interface and/or property data for the user, such as name, address, or other properties of a user. In embodiments where data is received from a plurality of different interface provider server computers, the received data may be stored in different manners with different numbers of feature groups and/or different feature groups.

In an embodiment, while the data sent to interface analysis server computer 130 comprises an anonymous identifier, the data may or may not include a known unique identifier. For example, an anonymous user may be assigned to a user when the user begins interacting with the graphical user interface, such as through a cookie or other generated identifier. Thus, an anonymous identifier may be specific to a particular session, browser, or computing device.

As used herein, a known unique identifier refers to an identifier corresponding to a specific user that can be used to identify the user on different applications, browsers, and/or devices. Known unique identifiers may comprise stored identifiers specific to particular users, such as usernames, internally stored identifiers corresponding to logged-in users, email addresses, or other identifiers that are specific to a particular user that has self-identified through a graphical user interface. In an embodiment, known unique identifiers may be specific to particular entities. For example, a single user may have a first known unique identifier with a first entity and a second known unique identifier with a second entity.

Interface analysis server computer 130 may be configured to store the event records in persistent storage, such as on a cloud storage device. In an embodiment, interface analysis server computer 130 groups a plurality of event records together and compresses them before storing them in a compressed format. Each compressed group of event records may be stored with a unique file path. In an embodiment, the API of interface analysis server computer 130 may be configured to automatically perform the grouping, compression, and storage of the event records on interface analysis server computer 130 and/or external storage.

In an embodiment, interface analysis server computer 130 and/or external storage device may be configured to send the file paths of stored compression records to a data ingest service of interface analysis server computer 130. For example, in response to a new compressed set of records being stored, interface analysis server computer 130 and/or external storage device may write the file path of the compressed set of records to a publish-subscribe (pub/sub) queue. As a practical example, a cloud server may be configured to respond to a trigger of a new file being stored by publishing an event to a pub/sub queue which contains the file path.

Using the data receiving methods described herein, interface analysis server computer 130 optimizes receipt of data from a plurality of different sources, each of which may include different feature groups and thus be different sizes. By compressing groups of records, interface analysis server computer 130 reduces storage costs for persistently storing all of the received event records. Then, by publishing events to a pub/sub queue when files are stored or having an external storage device publish events to the pub/sub queue when files are stored, interface analysis server computer 130 is able to ingest event data in a streaming manner, where event files are accessed and ingested as they are stored or received. This also allows the initial storage of the events to be separated for the ingesting of the events, which can be performed in parallel to the event storage.

3.2. Data Ingest

Figure 2:
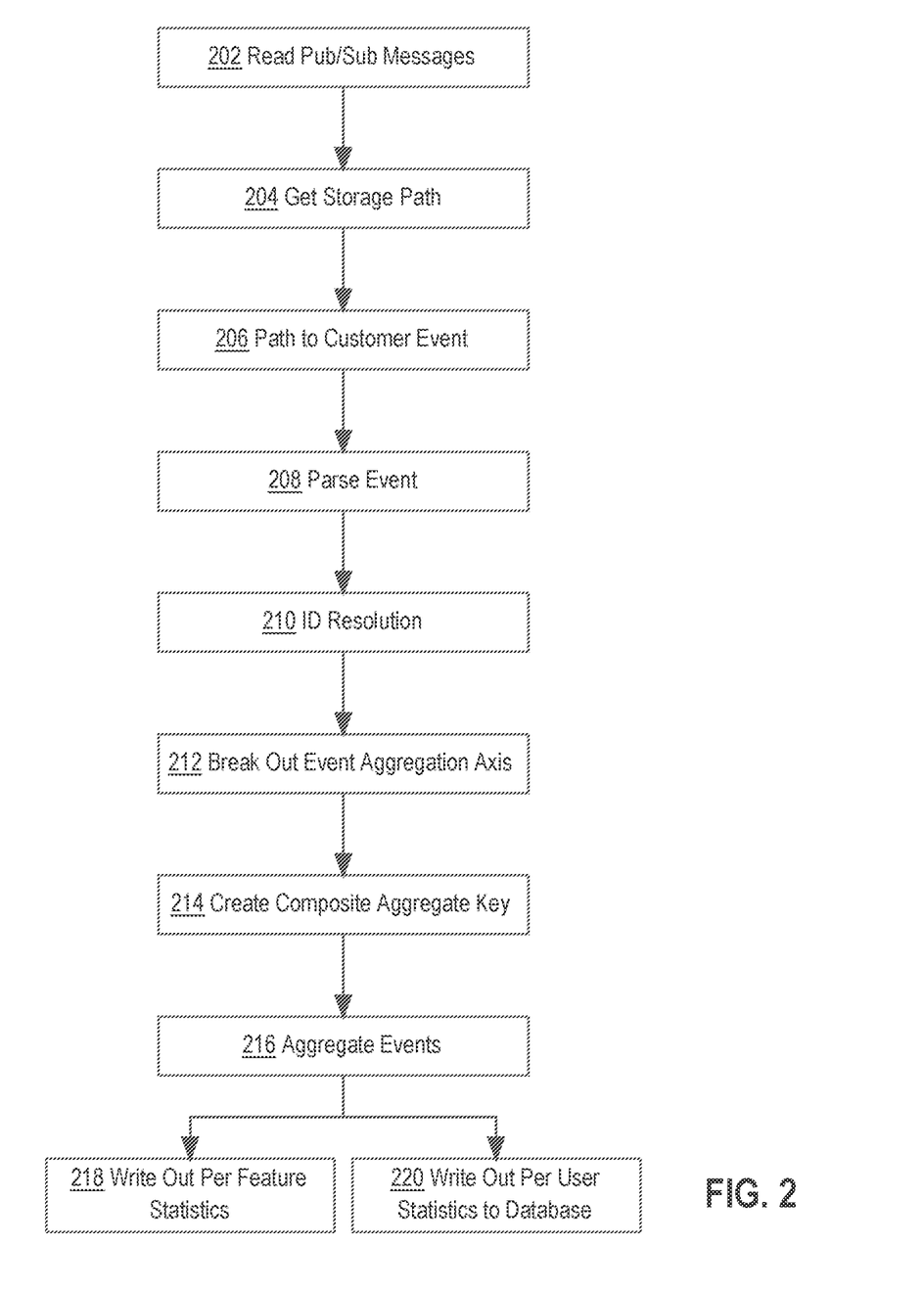
FIG. 2 depicts aspects of an example process for ingesting event records to generate aggregated events.

FIG. 2 depicts an example process for ingesting event records to generate aggregated events.

In an embodiment, between one or more of the steps of FIG. 2, data is persisted into memory. For example, parsed events may be persistent to memory after step 208, then used to perform identity resolution in step 210. The identity resolved events may then be persisted to memory, replacing the parsed events stored after step 208. By persisting data to memory between steps, the process of FIG. 2 allows for definition of a pipeline that scales to a plurality of workers. For example, one worker may perform the parsing of events while a different worker performs the identity resolution of previously parsed events. This parallelization of processing allows interface analysis server computer 130 to perform the data ingest and aggregation of events faster and more efficiently, thereby providing aggregated data closer to real-time than previous methods.

In an embodiment, input data is also discarded at each step, with only data needed for the next steps being written to memory. For example, broken out events may be discarded after event aggregations are performed in step 216. In some instances, the input data may be passed through a step. For example, parsed events may be passed through the pipeline during identity resolution.

At step 202, a pub/sub message comprising a file path is read by interface analysis server computer 130. For example, interface analysis server computer 130 may subscribe to a pub/sub queue which writes a new message when a file is stored. Interface analysis server computer 130 may read the message when the message is written to the pub/sub queue and/or may continually read messages from the pub/sub queue.

At step 204, a file path is retrieved from the pub/sub message. The file path may be written as a string stored in the pub/sub message. Interface analysis server computer 130 may extract the file path from the pub/sub message and store the file path string. While steps 202 and 204 are described with reference to a pub/sub queue, other embodiments may utilize other methods of retrieving messages, such as periodic requesting of messages from a file storage. The system may be configured to request messages periodically or in response to computational resources becoming available, such as when event records are removed from the pipeline.

At step 206, event data is retrieved from storage using the file path. The event data may be decompressed at this point and separated back into a plurality of event records, each of the plurality of event records comprising at least an anonymous identifier and one or more feature groups. The event records may additionally comprise an identifier of an entity corresponding to interface provider server computer 120. The identifier of the entity may be extracted from the event records. In an embodiment, each of the plurality of event records comprises a separate JSON string.

At step 208, the event records are parsed. For example, a JSON string may be parsed into a Plain Old Java Object (POJO). At this step, elements of the event record may be separated in the POJO. For example, interface analysis server computer 130 may store data defining how different entities store event records. As an example, the data may include identifiers of fields of data, delimiters used by the entity, and/or other rules relating to the storage of event data. Interface analysis server computer 130 may use an extracted identifier for a particular entity to identify data relating to how the particular entity stores event records. This data may be used to parse event records into individual properties and/or traits. Additionally, data may be extrapolated from some of the parsed data. For example, a portion of a top-level domain name may be used to identify an entity or referrer.

3.3. Identifier Resolution

At step 210, interface analysis server computer 130 performs identity resolution on the event record. For example, interface analysis server computer 130 may identify, from the parsed event records, whether a record comprises a known unique identifier for a user in addition to the anonymous identifier. Interface analysis server computer 130 may maintain a database which comprises anonymous identifiers and, for each anonymous identifier, a known unique identifier. The database may be segmented by entity in order to avoid collision between a same anonymous identifier having different unique known identifiers for different entities. Interface analysis server computer 130 may use the database to identify known identifiers for anonymous identifiers.

Figure 3:
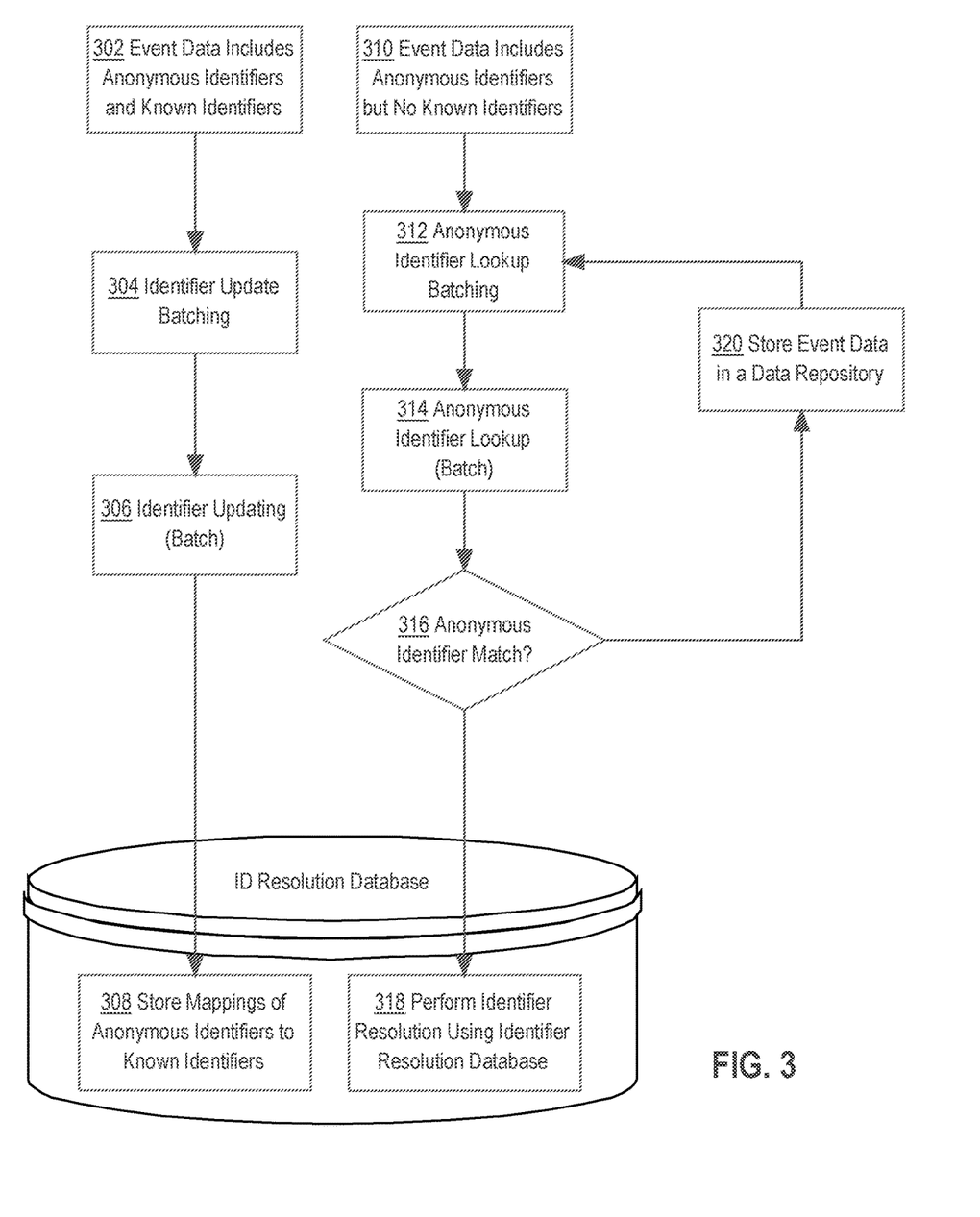
FIG. 3 depicts aspects of an example method for performing identity resolution for event records.

FIG. 3 depicts an example method for performing identity resolution for event records. FIG. 3 includes two flows, one flow for when a known identifier is received and a second flow for when a known identifier is not received. Thus, both events with known unique identifiers and events without known unique identifiers may be utilized in the identifier resolution step.

At step 302, event data is received which includes both anonymous identifiers and known identifiers. For example, the event data may include an identifier of a cookie and an identifier of a user obtained by the user logging in through a user interface.

At step 304, the identifiers are batched for updating the identifier resolution database. For example, the anonymous identifiers and known identifiers may be extracted from the event data and stored in a buffer as key value pairs. The event data may then be sent to the next step of the pipeline of FIG. 2 for further processing. In an embodiment, the buffer is configured to merge identical entries. Thus, if five events are received with the same anonymous identifier and known identifier, the buffer may merge key value pairs into one instance of the key value pair, thereby removing duplicates from the buffer.

At step 306, interface analysis server computer 130 performs a batch operation to update identifiers in the identifier resolution database. Interface analysis server computer 130 may be configured to perform the batch operation in response to a batch update triggering event. For example, interface analysis server computer 130 may be configured to perform the batch operation at the earliest of when the buffer is filled, such as after 100 unique entries have been stored in the buffer, or when a particular period of time has passed since a first item was added to the buffer, such as fifteen seconds. Interface analysis server computer 130 may then send the key value pairs to the identifier resolution database to update the identifier resolution database.

At step 308, mappings of anonymous identifiers to known identifiers are stored in the identifier resolution database. For example, interface analysis server computer 130 may determine, for each key value pair, whether the key value pair is already stored in the database. If not, interface analysis server computer 130 may write the key value pair to the database.

At step 310, event data which includes anonymous identifiers, but no known identifiers is received by interface analysis server computer 130. For example, if a user does not self-identify, such as by logging in, the actions performed by the user may be stored in an event record with an anonymous identifier, such as a cookie identifier, but no known identifier.

At step 312, the event records with the anonymous identifiers are batched for lookup in the identifier resolution database. As the event records still need a known identifier to be attached to them, the event records may be passed through during this flow. Anonymous identifiers may be stored in a buffer for batch processing. As with the key value pairs buffer, the anonymous identifiers buffer may be configured to merge multiple entries with the same anonymous identifiers. Since the event records are also passed through this flow, the merging may comprise generating a single event record with the data from each merged event record along with a single anonymous identifier.

At step 314, interface analysis server computer 130 performs a batch lookup of anonymous identifiers in the identifier resolution database. Interface analysis server computer 130 may perform the batch lookup in response to batch resolution triggering event. For example, interface analysis server computer 130 may be configured to perform the batch operation at the earliest of when the buffer is filled, such as after 100 unique entries have been stored in the buffer, or when a particular period of time has passed since a first item was added to the buffer, such as fifteen seconds. Interface analysis server computer 130 may then query the identifier resolution database to determine whether the anonymous identifier is stored in the identifier resolution database.

At step 316, interface analysis server computer 130 determines whether the anonymous identifiers in the buffer are stored in the identifier resolution database. If interface analysis server computer 130 determines that an anonymous identifier is stored in the identifier resolution database, at step 318 interface analysis server computer 130 performs the identifier resolution using the data stored in the identifier resolution database. For example, interface analysis server computer 130 may identify a known identifier that is mapped to the anonymous identifier and update the event record with the anonymous identifier to include the identified known identifier.

If interface analysis server computer 130 determines that an anonymous identifier is not stored in the identifier resolution database, at step 320, the event record corresponding to the anonymous identifier is stored in a data repository. Interface analysis server computer 130 may be configured to send event records stored in the data repository back through the identifier lookup buffer in response to a re-ingest trigger event, such as periodically, after a given period of time has passed since an event record was stored in the data repository, after a threshold number of anonymous identifiers have been stored in the data repository, or as part of a pipeline of re-ingesting the event records for future lookups. In an embodiment, interface analysis server computer 130 is configured to remove event records which have not been matched after a particular number of cycles and/or a particular period of time.

A practical example is as follows. A user accesses an online store and begins searching for items to purchase. The provider of the online store creates a first event record with an anonymous user identifier which includes the search actions and sends it to interface analysis server computer 130. The user later selects a "checkout option" and then logs into a user account. The provider of the online store creates a second event record with the anonymous user identifier, the checkout and login actions, and a known user identifier corresponding to the login credentials provided by the user.

When the first event record reaches the identifier resolution stage, interface analysis server computer 130 determines that the anonymous identifier is not stored in the identifier resolution database and, in response, stores the first event record in the data repository. When the second event record reaches the identifier resolution stage, the known identifier of the user and anonymous identifier of the user are stored in the identifier resolution database.

Later, when the first record is re-ingested from the data repository, interface analysis server computer 130 identifies the anonymous identifier now stored in the identifier resolution database and updates the first even record to include the stored known identifier which is mapped to the anonymous identifier.

The methods described herein allow for real-time identity resolution for users who use multiple devices or who access a website while logged out. Additionally, the methods described allow the system to process data as it is received while still being able to utilize action data performed by a user prior to logging in. Such methods improve the usability of data for performing causal inference and/or for training machine learning systems with complete information.

3.4. Data Aggregation

Returning to FIG. 2, at step 212, event aggregation axes are broken out of the parsed events. Breaking out a feature group, as used herein, refers to separating feature groups and identifying separated feature groups with a feature group name for future aggregation. An event aggregation axis, as used herein, refers to a feature group over which an aggregation is to be performed. The event aggregation axis may be a categorical type of feature group, count type of feature group, or static type of feature group. A categorical type of feature group, as used herein, refers to a feature group with unique values, such as user traits. A count type of feature group, as used herein, refers to a feature group with only one type of value, such as performance of user actions. A static type of feature group, as used herein, refers to a categorical type of feature group with greater than a threshold number of unique values, such as twenty unique values. The event aggregation axis may be individual to a user and/or may be generated for all users from a particular interface provider server computer.

Interface analysis server computer 130 may store data defining which feature groups to break out and a type of aggregation to be performed on the type of feature groups. As event definitions may differ between interface provider server computers 120, the definitions of which events to break out and a type of aggregation to be performed may be defined for different interface provider server computers. Interface analysis server computer 130 may identify the interface provide server computer from the parsed event data and, in response, select the breakout definitions for interface provider server computer 120. The breakout definitions may include identifications of fields, data types stored in the field, and/or whether the aggregation is a count type, categorical type, or static type of aggregation.

In an embodiment interface analysis server computer 130 determines whether to break out a category based on received event data. For example, interface analysis server computer 130 may initially parse events for a particular interface provider server computer. For a particular feature group, interface analysis server computer 130 may determine a number of unique values the events contain. For example, an account balance attribute may have a large number of unique values while a gender attribute may have a relatively small number of unique values.

Interface analysis server computer 130 may determine if the number of unique values is greater than a threshold value, such as 100, making it a static type of feature group. If the number of unique values is greater than the threshold value, interface analysis server computer 130 may store data indicating that the feature group should not be broken out for categorical aggregation, marking it for static aggregation in the future. Thus, when interface analysis server computer 130 later breaks out feature groups, interface analysis server computer 130 may break out any categorical feature groups that have not been identified in stored data as static feature groups.

At step 214, the event aggregation axes are used to generate a composite key comprising the event aggregation axes for use in performing the aggregation. The key may comprise a user identifier, feature group name, entity identifier, and hour. The entity identifier may identify an entity corresponding to a particular interface provider server computer. For example, a first event aggregation axis broken out of the parsed events may comprise an action of performing a search while a second event aggregation axis may comprise a relationship status. A key for the first aggregation axis may take the form of [UID342, search, CID247, 2019-12-24 12], indicating an aggregation for user identifier 342 and entity identifier 247 over search actions performed in the 12-1 hour of Dec. 24, 2019. A key for the second aggregation axis may take the form of [UID342, relationship, CID 247, 2019-12-24 12], indicating an aggregation for user identifier 342 and entity identifier 247 over relationship status during the 12-1 hour of Dec. 24, 2019.

At step 216, events are aggregated using the composite keys. Aggregation of events may differ depending on a type of aggregation. For categorical feature groups, such as traits or properties, interface analysis server computer 130 may store a first value, a last value, and every unique value. For example, if a relationship status for a particular user identifier was listed as "single" in a first fifty events and "in a relationship" in a next hundred events, interface analysis server computer 130 may aggregate the events for that user into ["single", "in a relationship", "single" "in a relationship"] where the first element is the first value, the second element is the last value, and the third element is all of the unique values. For count type feature groups, such as actions performed on a website, interface analysis server computer 130 may count a number of instances of the action in the events. For example, if a user selected the search function six times, the server computer may store [6] as the aggregated value for the user. For static feature groups, such as traits or properties with a large amount of distinct values, interface analysis server computer 130 may store a last value. For example if an account balance for a particular user starts as 103.00 and then changes to 150.00 the aggregated value for that user will be "150.00".

As described above, the composite key may include an hour element. Thus, interface analysis server computer 130 may only aggregate events with timestamps that are within a particular hour. In an embodiment, interface analysis server computer 130 batches events before performing the aggregation. For example, interface analysis server computer 130 may be configured to perform aggregations in response to an aggregation triggering event, such as when the number of elements in the buffer exceeds a particular value, such as 10,000, or ten minutes after a first element was added to the buffer, whichever comes first. Thus, interface analysis server computer 130 ensures fast turn-around for aggregated data while also setting a limit on a number of aggregations to be performed, thereby decreasing the computational cost. Interface analysis server computer 130 may also be configured to discard aggregated data, such that aggregations are performed on top of pre-aggregated data. While extra data may be written to memory using this method, it greatly reduces the computational cost of performing aggregations.

In an embodiment, interface analysis server computer 130 does not perform aggregations on events with a timestamp older than a particular value, such as a year old. For example, interface analysis server computer 130 may support replay of old data into the pipeline but no older than a year. The timestamp that determines the event time may be the time the event occurred on the interface provider computer 120. As the original event strings are persistently stored, the pipeline can be initiated with old events. Interface analysis server computer 130 may be configured to determine if an event is over a year old and, if so, may not aggregate the event at step 216.

At step 218, the per user statistics are written out to a database table. The per user statistics comprise aggregated data for each feature group over which an aggregation was performed. Methods for storing the per user statistics in a database table are described further herein.

At step 220, per feature group statistics are written out to a front-end service. For example, interface analysis server computer 130 may, after writing the per user statistics out to the database table, perform a second aggregation over the per user statistics without the user identifier as part of the aggregated key. Thus, the aggregation occurs across a plurality of user identifiers, producing an aggregation for each feature group, customer, and hour combination. The per feature aggregation may be performed at any point after the per user aggregation, as the per user aggregated data is stored in a database table. Interface analysis server computer 130 may provide capabilities to interface provider server computers to generate queries over the aggregated data. Interface analysis server computer 130 may be configured to provide a graphical user interface comprising the results of the queries, such as in aggregated statistics or over-time aggregated statistics.

3.5. Aggregated Data Storage

In an embodiment, the per user statistics are stored in a database table configured to work well with a large number of entries that are relatively small. For example, the per user statistics may be written out to an unindexed database table which can have multiple workers assigned to the data, such as by assigning a different worker to each of a plurality of chunks of data, thereby allowing parallel processing in querying and aggregation.

In order to use the per user statistics table, which is optimized for entries that are relatively small, interface analysis server computer 130 may store the aggregated statistics in a compact manner. For example, each user identifier and feature group name may be hashed to integers. A database row may comprise the integer user identifier, integer feature group name, aggregated value, hour of aggregation, aggregation type, group type, and time of ingestion into the database table. Except for aggregated values of categorical and static type aggregations which will include strings, each of the elements in the database row may be represented with either an integer or a timestamp, both of which take up a maximum of sixty-four bits. Thus, database rows are kept compact.

In an embodiment, categorical and static type data is kept separate from count type data. For example, interface analysis server computer 130 may store an attributes database table and an actions database table. The separate database tables allow the system to use one type of data format for the aggregations, as the categorical and static type data comprises string format aggregations while the count type data comprises integer format aggregations.

In an embodiment, the per user statistics tables, or attribute and count tables, are hourly tables which are partitioned by aggregation hour. Thus, aggregations in a first hour window may be stored in a first section of the table while aggregations in a second hour window may be stored in a second section of the table. Partitioning tables by hour allows for optimization of queries for aggregated data based on the hour of the event. Such queries may be used to generate hourly graphs of interface usage based on the aggregated feature group data. Interface analysis server computer 130 may decrease storage costs by flushing old data from the hourly table. For example, data with an ingestion time into the table of ninety days or older may be removed from the hourly table.

In order to maintain useful data without overloading storage capacity, interface analysis server computer 130 may store one or more additional tables with further aggregations. For example, the server computer may store one or more of a daily table, a rolling weekly table, and/or an all-time table. Each table may store rows comprising a user identifier, a feature group identifier, a value of the aggregation, and/or a time period. For the daily table, the time period may be a timestamp of a day on which the events occurred. For the rolling weekly table, the time period may be an integer identifying a week in which it occurred. The all-time table may store no time period value for each row, as the all-time table comprises complete aggregations from inception to a current time.

In embodiments, the daily, rolling weekly, and/or all-time database tables may also be separated into attribute type tables, including categorical and static type feature groups, and count type tables. The count type tables may store a running count of each action performed, with the count being updated periodically, such as every hour, as an aggregation of data in the hourly table or tables. The attribute type tables may store aggregated values during the time period of aggregation.

The daily, rolling weekly, and all-time tables provide different benefits to interface analysis server computer 130. The daily table comprises statistics that would be difficult to group hourly, such as sparsely performed actions. The rolling weekly table provides inputs for a feature matrix that can be used to train a machine learning system based on a recent iteration of an interface. The all-time table provides complete aggregated statistics, allowing for the visualization of a user's journey throughout usage of the interface.

4. BENEFITS OF CERTAIN EMBODIMENTS

The systems and methods described herein provide technical improvements to data gathering techniques. Generally, interface tracking involves a large amount of data which can be computationally intensive to process and can take up a large amount of memory for storage. The techniques described herein provide a streamlined pipeline architecture whereby data can be ingested and processed in real-time in a manner that reduces storage costs and computational complexity. By removing input data and persisting data into memory between each step, the systems and methods described herein allow for parallel processing of different steps of the pipeline.

Additionally, the systems and methods described herein provide improvements in generating training matrices for training a machine learning system to compute causal inferences, such as described in Ser. No. 16/525,457, filed Jul. 29, 2019, the entire contents of which are incorporated by reference as if fully set forth herein. By performing identity resolution in the manner described, data ingested prior to a user logging in is made usable in a machine learning system, thereby providing increased accuracy in modeling causal inference.

5. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
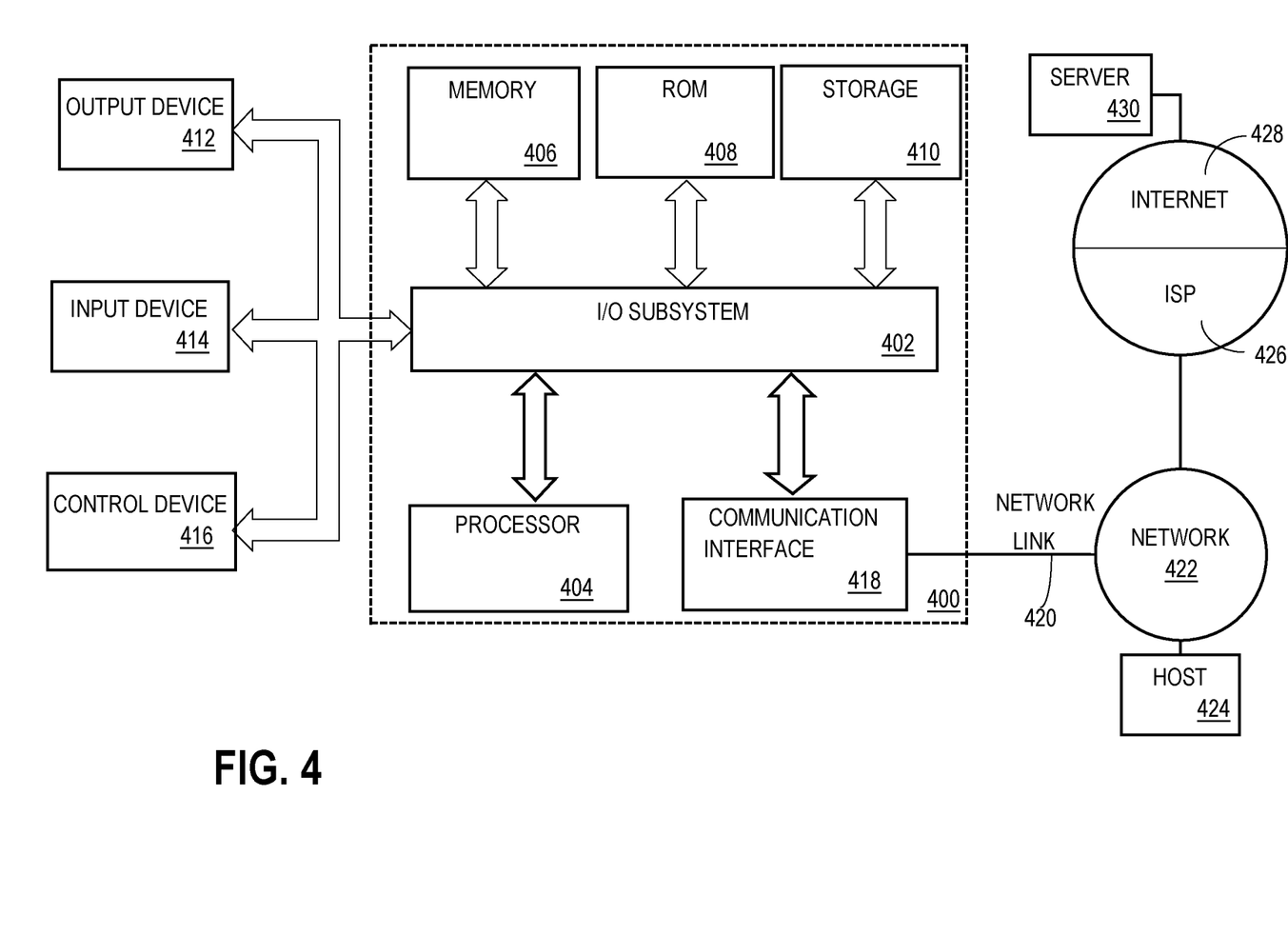
FIG. 4 is a block diagram that illustrates a computer system upon which an embodiment may be implemented.

For example, FIG. 4 is a block diagram that illustrates a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

The invention claimed is:

1. A computer-implemented data processing method for data ingestion in real time comprising:
   receiving, at a server computer from a storage device, a message comprising one or more client events, the storage device being configured to publish the message to a publish/subscribe queue in response to storing the one or more client events and the server computer receives the message based on having subscribed to the publish/subscribe queue;
   accessing the one or more client events and storing the one or more client events as raw event strings;
   parsing the one or more raw event strings to generate one or more parsed event strings;
   for each of the one or more parsed event strings:
      determining whether the one or more parsed event strings comprises both an anonymous identifier and known identifier, and whether the one or more parsed event strings comprises an anonymous identifier and no known identifier;
      in response to determining that the one or more parsed event strings comprises both an anonymous identifier and known identifier, transmitting the anonymous identifier and known identifier to a process that is programmed to update an identifier resolution database;
      in response to determining that the one or more parsed event strings comprise an anonymous identifier and no known identifier, transmitting the anonymous identifier to a process that is programmed to identify a known identifier using the identifier resolution database;
   identifying, in the one or more parsed event strings, one or more feature groups over which to perform an aggregation;
   generating one or more composite keys, each of the one or more composite keys comprising a user identifier, a feature group identifier of a particular feature group of the one or more feature groups, an interface provider identifier, and an hour identifier;
   using the one or more composite keys, performing one or more aggregations of a plurality of the parsed event strings, resulting in creating aggregated data;
   storing the aggregated data in one or more aggregation tables.

2. The computer-implemented data processing method of claim 1, wherein the process that is programmed to identify a known identifier using the identifier resolution database comprises:
   storing, in a buffer, the anonymous identifier and the one or more parsed event strings;
   detecting a batch resolution triggering event and, in response, performing a batch lookup of identifiers stored in the buffer in the identity resolution database;
   during the batch lookup, identifying the anonymous identifier in a key-value pair stored in the identifier resolution database, the key-value pair comprising the anonymous identifier and a known identifier;
   in response to identifying the anonymous identifier in the key-value pair stored in the identifier resolution database, updating the one or more parsed event strings to include the known identifier.

3. The computer-implemented data processing method of claim 2, wherein the batch resolution triggering event comprises one or more of the buffer comprising more than a threshold number of unique entries or passage of a particular period of time since a first item was added to the buffer.

4. The computer-implemented data processing method of claim 1, wherein the process that is programmed update the identifier resolution database comprises:
   storing, in a buffer, a key-value pair comprising the anonymous identifier and the known identifier;
   detecting a batch update triggering event and, in response, performing a batch update to the identifier resolution database using key-value pairings stored in the buffer, updating the identifier resolution database comprising adding an entry to the identifier resolution database comprising the key-value pair.

5. The computer-implemented data processing method of claim 4, wherein the batch update triggering event comprises one or more of the buffer comprising more than a threshold number of unique entries or passage of a particular period of time since a first item was added to the buffer.

6. The computer-implemented data processing method of claim 1, wherein performing the one or more aggregations of the plurality of the parsed event strings comprises:
   for a categorical feature group, generating a record comprising a first value, a last value, and all unique values of the categorical feature group in the plurality of parsed event strings for a particular user identifier;
   for a static feature group, generating a record comprising a last value of the static feature group in the plurality of parsed event strings for the particular user identifier; and for a count feature group, generating a record comprising a count of a number of instances of the count feature group in the plurality of parsed event strings for the particular user identifier.

7. A computer-implemented data processing method for identity resolution comprising:
   storing, in an identifier resolution database, a plurality of key-value pairs, each of the plurality of key-value pairs comprising an anonymous identifier and a known identifier;
   receiving a first parsed event string comprising a particular anonymous identifier and a particular known identifier;
   storing, in a first buffer, a particular key-value pair comprising the particular anonymous identifier and the particular known identifier;
   detecting a batch update triggering event and, in response, performing a batch update to the identifier resolution database using key-value pairings stored in the first buffer, updating the identifier resolution database comprising adding an entry to the identifier resolution database comprising the particular key-value pair;
   receiving a second parsed event string comprising the particular anonymous identifier and no known identifier;
   storing, in a second buffer, the particular anonymous identifier and the second parsed event string;
   detecting a batch resolution triggering event and, in response, performing a batch lookup of identifiers stored in the second buffer in the identifier resolution database;
   during the batch lookup, identifying the particular anonymous identifier in the particular key-value pair stored in the identifier resolution database and, in response, updating the second parsed event string to include the particular known identifier.

8. The computer-implemented data processing method of claim 7, wherein the batch resolution triggering event comprises one or more of the buffer comprising more than a threshold number of unique entries or passage of a particular period of time since a first item was added to the buffer.

9. The computer-implemented data processing method of claim 7, wherein the batch update triggering event comprises one or more of the buffer comprising more than a threshold number of unique entries or passage of a particular period of time since a first item was added to the buffer.

10. The computer-implemented data processing method of claim 7, further comprising:
    during the batch lookup, determining that a second anonymous identifier is not stored in the identifier resolution database and, in response, storing the second anonymous identifier and one or more corresponding parsed event strings in a data repository;
    in response to a re-ingest triggering event, removing the second anonymous identifier and the one or more corresponding parsed event strings from the data repository and storing the second anonymous identifier and the one or more corresponding parsed event strings in second buffer.

11. The computer-implemented data processing method of claim 10, wherein the re-ingest triggering event is a periodic re-ingesting, a determination that a particular period of time has passed since the second anonymous identifier and the one or more corresponding parsed event strings were stored in the data repository, or a determination that a threshold number of anonymous identifiers have been stored in the data repository.

12. The computer-implemented data processing method of claim 10, further comprising:
    after storing the second anonymous identifier and the one or more corresponding event strings from the data repository in the second buffer, performing a second batch lookup of identifiers stored in the second buffer in the identifier resolution database;
    during the second batch lookup, determining that the second anonymous identifier is not stored in the identifier resolution database;
    determining that the second anonymous identifier has not been matched during a batch lookup after a particular number of cycles or a particular period of time and, in response, removing the second anonymous identifier and the one or more corresponding event strings from storage.

13. A computer-implemented data processing method for data aggregation comprising:
    receiving a plurality of parsed event strings, each of the plurality of parsed event strings comprising a plurality of feature groups;
    using the plurality of parsed event strings, generating a plurality of composite keys, each of the plurality of composite keys comprising at least a user identifier, a feature group identifier, an interface provider identifier, and an hour identifier;
    storing, the plurality of parsed event strings in a buffer;
    detecting an aggregation triggering event and, in response, performing a plurality of aggregations of the plurality of parsed event strings in the buffer using the plurality of composite keys to generate aggregated event records, the plurality of aggregations comprising:
       for a categorical feature group, generating a record comprising a first value, a last value, and all unique values of the categorical feature group in the plurality of parsed event strings for an end user;
       for static feature group, generating a record comprising of a last value of the static feature group in the plurality of parsed event strings for an end user; and
       for a count feature group, generating a record comprising a count of a number of instances of the count feature group in the plurality of parsed event strings for an end user;
    storing the aggregated event records in a database table.

14. The computer-implemented data processing method of claim 13, wherein the aggregation triggering event comprises one or more of the buffer comprising more than a threshold number of parsed event strings or passage of a particular period of time since a first parsed event string was added to the buffer.

15. The computer-implemented data processing method of claim 13, further comprising:
    performing a second plurality of aggregations on the aggregated event records, the second plurality of aggregations comprising aggregations without user identifiers, to generate per-feature aggregated statistics;
    sending the per-feature aggregated statistics to a front-end service.

16. The computer-implemented data processing method of claim 13, wherein the database table comprises the aggregated event records partitioned by hour.

17. The computer-implemented data processing method of claim 13 further comprising:
    performing a second plurality of aggregations on the aggregated event records to generate further aggregated statistics and storing the further aggregated statistics in one or more of a daily table, a rolling weekly table, or an all-time table.

18. A system comprising:
one or more processors;
a memory storing instructions which, when executed by the one or more processors, cause performance of:
receiving, from a storage device, a message comprising one or more client events, the storage device being configured to publish the message to a publish/subscribe queue in response to storing the one or more client events and the server computer receives the message based on having subscribed to the publish/subscribe queue;
accessing the one or more client events and storing the one or more client events as raw event strings;
parsing the one or more raw event strings to generate one or more parsed event strings;
for each of the one or more parsed event strings:
determining whether the one or more parsed event strings comprises both an anonymous identifier and known identifier, and whether the one or more parsed event strings comprises an anonymous identifier and no known identifier;
in response to determining that the one or more parsed event strings comprises both an anonymous identifier and known identifier, transmitting the anonymous identifier and known identifier to a process that is programmed to update an identifier resolution database;
in response to determining that the one or more parsed event strings comprise an anonymous identifier and no known identifier, transmitting the anonymous identifier to a process that is programmed to identify a known identifier using the identifier resolution database;
identifying, in the one or more parsed event strings, one or more feature groups over which to perform an aggregation;
generating one or more composite keys, each of the one or more composite keys comprising a user identifier, a feature group identifier of a particular feature group of the one or more feature groups, an interface provider identifier, and an hour identifier;
using the one or more composite keys, performing one or more aggregations of a plurality of the parsed event strings, resulting in creating aggregated data;
storing the aggregated data in one or more aggregation tables.

19. The system of claim 18, wherein the process that is programmed to identify a known identifier using the identifier resolution database comprises:
storing, in a buffer, the anonymous identifier and the one or more parsed event strings;
detecting a batch resolution triggering event and, in response, performing a batch lookup of identifiers stored in the buffer in the identity resolution database;
during the batch lookup, identifying the anonymous identifier in a key-value pair stored in the identifier resolution database, the key-value pair comprising the anonymous identifier and a known identifier;
in response to identifying the anonymous identifier in the key-value pair stored in the identifier resolution database, updating the one or more parsed event strings to include the known identifier.

20. The system of claim 19, wherein the batch resolution triggering event comprises one or more of the buffer comprising more than a threshold number of unique entries or passage of a particular period of time since a first item was added to the buffer.

21. The system of claim 18, wherein the process that is programmed update the identifier resolution database comprises:
storing, in a buffer, a key-value pair comprising the anonymous identifier and the known identifier;
detecting a batch update triggering event and, in response, performing a batch update to the identifier resolution database using key-value pairings stored in the buffer, updating the identifier resolution database comprising adding an entry to the identifier resolution database comprising the key-value pair.

22. The system of claim 21, wherein the batch update triggering event comprises one or more of the buffer comprising more than a threshold number of unique entries or passage of a particular period of time since a first item was added to the buffer.

23. The system of claim 18, wherein performing the one or more aggregations of the plurality of the parsed event strings comprises:
for a categorical feature group, generating a record comprising a first value, a last value, and all unique values of the categorical feature group in the plurality of parsed event strings for a particular user identifier;
for a static feature group, generating a record comprising a last value of the static feature group in the plurality of parsed event strings for the particular user identifier; and
for a count feature group, generating a record comprising a count of a number of instances of the count feature group in the plurality of parsed event strings for the particular user identifier.

24. A system comprising:
one or more processors;
a memory storing instructions which, when executed by the one or more processors, causes performance of:
storing, in an identifier resolution database, a plurality of key-value pairs, each of the plurality of key-value pairs comprising an anonymous identifier and a known identifier;
receiving a first parsed event string comprising a particular anonymous identifier and a particular known identifier;
storing, in a first buffer, a particular key-value pair comprising the particular anonymous identifier and the particular known identifier;
detecting a batch update triggering event and, in response, performing a batch update to the identifier resolution database using key-value pairings stored in the first buffer, updating the identifier resolution database comprising adding an entry to the identifier resolution database comprising the particular key-value pair;
receiving a second parsed event string comprising the particular anonymous identifier and no known identifier;
storing, in a second buffer, the particular anonymous identifier and the second parsed event string;
detecting a batch resolution triggering event and, in response, performing a batch lookup of identifiers stored in the second buffer in the identifier resolution database;
during the batch lookup, identifying the particular anonymous identifier in the particular key-value pair stored in the identifier resolution database and, in response, updating the second parsed event string to include the particular known identifier.

25. The system 24, wherein the batch resolution triggering event comprises one or more of the buffer comprising more than a threshold number of unique entries or passage of a particular period of time since a first item was added to the buffer.

26. The system of claim 24, wherein the batch update triggering event comprises one or more of the buffer comprising more than a threshold number of unique entries or passage of a particular period of time since a first item was added to the buffer.

27. The system of claim 24, wherein the instructions, when executed by the one or more processors, further causes performance of:
during the batch lookup, determining that a second anonymous identifier is not stored in the identifier resolution database and, in response, storing the second anonymous identifier and one or more corresponding parsed event strings in a data repository;
in response to a re-ingest triggering event, removing the second anonymous identifier and the one or more corresponding parsed event strings from the data repository and storing the second anonymous identifier and the one or more corresponding parsed event strings in second buffer.

28. The system of claim 27, wherein the re-ingest triggering event is a periodic re-ingesting, a determination that a particular period of time has passed since the second anonymous identifier and the one or more corresponding parsed event strings were stored in the data repository, or a determination that a threshold number of anonymous identifiers have been stored in the data repository.

29. The system of claim 27, wherein the instructions, when executed by the one or more processors, further causes performance of:
after storing the second anonymous identifier and the one or more corresponding event strings from the data repository in the second buffer, performing a second batch lookup of identifiers stored in the second buffer in the identifier resolution database;
during the second batch lookup, determining that the second anonymous identifier is not stored in the identifier resolution database;
determining that the second anonymous identifier has not been matched during a batch lookup after a particular number of cycles or a particular period of time and, in response, removing the second anonymous identifier and the one or more corresponding event strings from storage.

30. A system comprising:
receiving a plurality of parsed event strings, each of the plurality of parsed event strings comprising a plurality of feature groups;
using the plurality of parsed event strings, generating a plurality of composite keys, each of the plurality of composite keys comprising at least a user identifier, a feature group identifier, an interface provider identifier, and an hour identifier;
storing, the plurality of parsed event strings in a buffer;
detecting an aggregation triggering event and, in response, performing a plurality of aggregations of the plurality of parsed event strings in the buffer using the plurality of composite keys to generate aggregated event records, the plurality of aggregations comprising:
for a categorical feature group, generating a record comprising a first value, a last value, and all unique values of the categorical feature group in the plurality of parsed event strings for a particular user identifier;
for a static feature group, generating a record comprising a last value of the static feature group in the plurality of parsed event strings for the particular user identifier; and
for a count feature group, generating a record comprising a count of a number of instances of the count feature group in the plurality of parsed event strings for the particular user identifier;
storing the aggregated event records in a database table.

31. The system of claim 30, wherein the aggregation triggering event comprises one or more of the buffer comprising more than a threshold number of parsed event strings or passage of a particular period of time since a first parsed event string was added to the buffer.

32. The system of claim 30, wherein the instructions, when executed by the one or more processors, further causes performance of:
performing a second plurality of aggregations on the aggregated event records, the second plurality of aggregations comprising aggregations without user identifiers, to generate per-feature aggregated statistics;
sending the per-feature aggregated statistics to a front-end service.

33. The system of claim 30, wherein the database table comprises the aggregated event records partitioned by hour.

34. The system of claim 30, wherein the instructions, when executed by the one or more processors, further causes performance of:
performing a second plurality of aggregations on the aggregated event records to generate further aggregated statistics and storing the further aggregated statistics in one or more of a daily table, a rolling weekly table, or an all-time table.

* * * * *